US010848945B2

(12) United States Patent
Choi

(10) Patent No.: US 10,848,945 B2
(45) Date of Patent: Nov. 24, 2020

(54) APPARATUS AND METHOD FOR TRANSMITTING AND RECEIVING SIGNALS IN MESH NETWORK

(71) Applicant: Samsung Electronics Co., Ltd., Suwon-si (KR)

(72) Inventor: Dae-Kyu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/744,519

(22) PCT Filed: Jul. 26, 2016

(86) PCT No.: PCT/KR2016/008167
§ 371 (c)(1),
(2) Date: Jan. 12, 2018

(87) PCT Pub. No.: WO2017/018782
PCT Pub. Date: Feb. 2, 2017

(65) Prior Publication Data
US 2018/0206094 A1 Jul. 19, 2018

(30) Foreign Application Priority Data
Jul. 28, 2015 (KR) .......................... 10-2015-0106481

(51) Int. Cl.
*H04W 4/70* (2018.01)
*H04L 29/08* (2006.01)
(Continued)

(52) U.S. Cl.
CPC ............. *H04W 4/70* (2018.02); *H04L 12/12* (2013.01); *H04L 12/28* (2013.01); *H04L 29/08* (2013.01);
(Continued)

(58) Field of Classification Search
CPC ..................................................... Y02D 50/40
See application file for complete search history.

(56) References Cited

U.S. PATENT DOCUMENTS

2006/0259617 A1 11/2006 Lee
2008/0247335 A1* 10/2008 Rudnick ................. H04L 45/00
370/256
(Continued)

FOREIGN PATENT DOCUMENTS

JP  2004-208289 A1  7/2004
WO  2009-088263 A2  7/2009
(Continued)

*Primary Examiner* — Jamaal Henson
(74) *Attorney, Agent, or Firm* — Jefferson IP Law, LLP

(57) ABSTRACT

The present invention relates to a technology for sensor networks, machine to machine (M2M) communication, machine type communication (MTC) and the Internet of Things (IoT). The present disclosure can be utilized for smart services (smart homes, smart buildings, smart cities, smart cars or connected cars, health care, digital education, retail business, security and safety-related services, etc.) based on the aforementioned technology. The present invention relates to a method for transmitting and receiving, by a node, signals in a mesh network, comprising: a step of receiving, from another node, a connection request (Connect_REQ) message requesting the establishment of a connection while performing an advertisement process on the basis of an advertisement process cycle; a step of establishing a connection to the another node; and a step of transmitting, to the another node, a message comprising node information including at least one of the following: connection information between the nodes, the advertisement process cycle, or a scan process cycle which performs a scan process.

20 Claims, 8 Drawing Sheets

(51) Int. Cl.
*H04L 12/28* (2006.01)
*H04L 12/12* (2006.01)
*H04W 76/10* (2018.01)
*H04L 12/733* (2013.01)
*H04W 84/18* (2009.01)

(52) U.S. Cl.
CPC ............ *H04W 76/10* (2018.02); *H04L 45/20* (2013.01); *H04W 84/18* (2013.01); *Y02D 30/50* (2020.08)

(56) References Cited

U.S. PATENT DOCUMENTS

| | | | |
|---|---|---|---|
| 2011/0013606 A1 | 1/2011 | Seok | |
| 2011/0021142 A1* | 1/2011 | Desai | H04W 8/005 455/41.2 |
| 2011/0153818 A1* | 6/2011 | Vandwalle | H04L 69/28 709/224 |
| 2012/0057515 A1* | 3/2012 | Wu | H04L 12/189 370/312 |
| 2013/0040574 A1* | 2/2013 | Hillyard | H04W 8/005 455/41.2 |
| 2013/0070646 A1 | 3/2013 | Myers et al. | |
| 2013/0109314 A1* | 5/2013 | Kneckt | H04W 4/80 455/41.2 |
| 2013/0121325 A1* | 5/2013 | McCann | H04W 8/18 370/338 |
| 2013/0295921 A1 | 11/2013 | Bhargava et al. | |
| 2013/0315133 A1 | 11/2013 | Wang et al. | |
| 2014/0029567 A1 | 1/2014 | Grady | |
| 2014/0086125 A1 | 3/2014 | Polo et al. | |
| 2014/0094123 A1* | 4/2014 | Polo | H04W 52/0216 455/41.2 |
| 2014/0135042 A1* | 5/2014 | Buchheim | H04W 4/023 455/456.6 |
| 2014/0219168 A1 | 8/2014 | J00 | |
| 2014/0355517 A1* | 12/2014 | Reunamaki | H04W 8/005 370/328 |
| 2014/0355582 A1* | 12/2014 | Kamath | H04W 84/20 370/338 |
| 2015/0148868 A1* | 5/2015 | Shahandeh | A61N 1/37217 607/60 |
| 2015/0230155 A1 | 8/2015 | Jeong et al. | |
| 2015/0264554 A1* | 9/2015 | Addepalli | H04L 43/0858 370/328 |
| 2015/0289124 A1* | 10/2015 | Palin | H04W 8/005 455/41.2 |
| 2016/0088424 A1* | 3/2016 | Polo | H04W 4/80 455/41.1 |
| 2016/0278151 A1 | 9/2016 | Kwon et al. | |
| 2016/0323012 A1* | 11/2016 | Kwon | H04W 4/80 |

FOREIGN PATENT DOCUMENTS

| | | |
|---|---|---|
| WO | 2012-165726 A1 | 12/2012 |
| WO | 2014-014281 A1 | 1/2014 |
| WO | 2015-069024 A1 | 5/2015 |

* cited by examiner

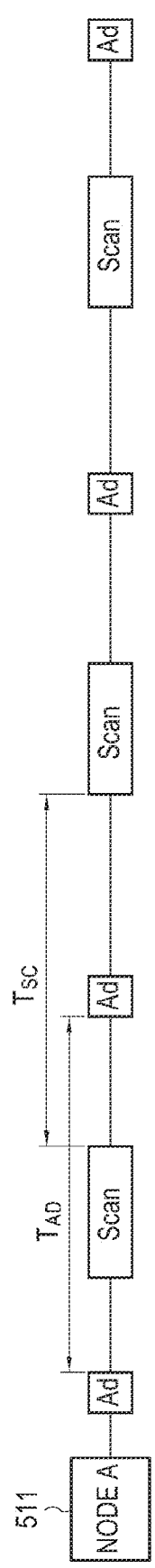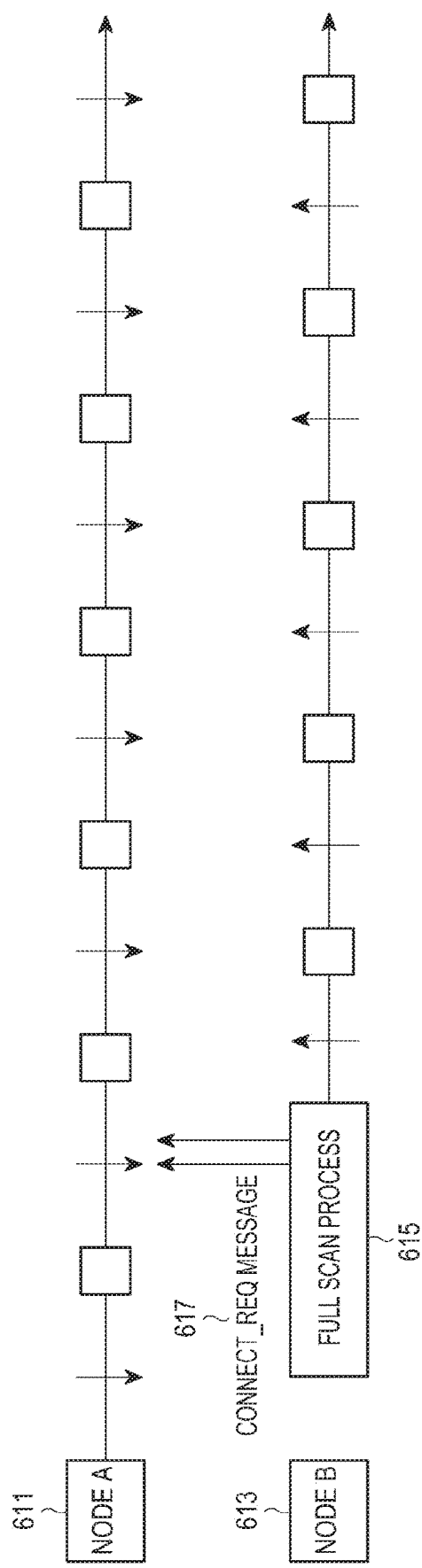
FIG.5
FIG.6

APPARATUS AND METHOD FOR TRANSMITTING AND RECEIVING SIGNALS IN MESH NETWORK

CROSS-REFERENCE TO RELATED APPLICATION(S)

This application is a U.S. National Stage application under 35 U.S.C. § 371 of an International application filed on Jul. 26, 2016 and assigned application number PCT/KR2016/008167, which claimed the benefit of a Korean patent application filed on Jul. 28, 2015 in the Korean Intellectual Property Office and assigned Serial number 10-2015-0106481, the entire disclosure of which is hereby incorporated by reference.

TECHNICAL FIELD

The present disclosure relates to an apparatus and method for transmitting/receiving a signal in a mesh network, and more particularly, to an apparatus and method for transmitting/receiving a signal in a mesh network supporting a connection scheme.

BACKGROUND ART

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Machine type communication is rapidly evolving from an M2M communication concept which supports communication between people and things, or between things, based on a mobile communication network into a concept of interacting with all information of real and virtual worlds as well as things while extending its area to the Internet. Namely, the M2M communication that enables the intelligent communication between people and things, or between things, at anytime and anywhere in real time in a stable and convenient manner is extending its area to IoT while connecting all surrounding things through the Internet.

The IoT refers to a technology of connecting various types of things, which have a sensor and a communication function embedded therein, to the Internet. Here, the things include various embedded systems (a computer system of an electronic device such as a smart phone), such as home appliances, a mobile device, wearable computers, etc. The things connected to the IoT have to be connected to an internet based on a unique internet protocol (IP) address by which the things can be identified, and may have sensors embedded therein for acquiring information from an external environment.

Recently, IoT has been rapidly developed, so a Bluetooth scheme, specially, a Bluetooth scheme which supports a Bluetooth low energy (BLE) mode has been attracted. Generally, a user may control devices to which a BLE mode is applied using a portable terminal, e.g., a smart phone, so devices to which a BLE mode is applied has been increased.

There is a need for a scheme of transmitting/receiving a signal by applying a mesh network to the BLE mode since the devices to which the BLE mode is applied has been increased.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure proposes an apparatus and method for transmitting/receiving a signal in a mesh network.

An embodiment of the present disclosure proposes an apparatus and method for transmitting/receiving a signal based on a network topology in a mesh network.

An embodiment of the present disclosure proposes an apparatus and method for transmitting/receiving a signal thereby signal retransmission is possible in a mesh network.

An embodiment of the present disclosure proposes an apparatus and method for transmitting/receiving a signal thereby preventing acknowledgement (ACK) delay in a mesh network.

An embodiment of the present disclosure proposes an apparatus and method for transmitting/receiving a signal thereby decreasing a collision occurrence probability in a mesh network.

An embodiment of the present disclosure proposes an apparatus and method for transmitting/receiving a signal thereby enhancing communication reliability in a mesh network.

An embodiment of the present disclosure proposes an apparatus and method for transmitting/receiving a signal thereby decreasing connection delay in a mesh network.

An embodiment of the present disclosure proposes an apparatus and method for transmitting/receiving a signal thereby decreasing power consumption in a mesh network.

An embodiment of the present disclosure proposes an apparatus and method for transmitting/receiving a signal thereby increasing a data rate in a mesh network.

Technical Solution

An embodiment of the present disclosure proposes a method for transmitting/receiving a signal in a node in a mesh network, and the method includes receiving a connection request (Connect_REQ) message for requesting to establish a connection from another node while performing an advertisement process based on an advertisement process period, establishing a connection with the another node, and transmitting, to the another node, a message including node information including at least one of connection information between nodes, the advertisement process period, and a scan process period as a period by which a scan process is performed.

An embodiment of the present disclosure proposes a method for transmitting/receiving a signal in a node in a mesh network, and the method includes receiving an advertisement message from another node while performing a scan process based on a scan process period, transmitting, to the another node, a connection request (Connect_REQ) message for requesting to establish a connection after receiving the advertisement message, establishing a connection with the another node, and receiving, from the another node, a message including node information including at least one of connection information between nodes, an advertisement process period as a period by which an advertisement process is performed, and the scan process period.

An embodiment of the present disclosure proposes a node in a mesh network, and the node includes a transmitter and a receiver, wherein the receiver receives a connection request (Connect_REQ) message for requesting to establish a connection from another node while performing an advertisement process based on an advertisement process period, wherein the transmitter and the receiver establish a connection with the another node, and wherein the transmitter performs an operation of transmitting, to the another node, a message including node information including at least one of connection information between nodes, the advertisement process period, and a scan process period as a period by which a scan process is performed.

An embodiment of the present disclosure proposes a node in a mesh network, and the node includes a transmitter and a receiver, wherein the receiver receives an advertisement message from another node while performing a scan process based on a scan process period, wherein the transmitter transmits, to the another node, a connection request (Connect_REQ) message for requesting to establish a connection after receiving the advertisement message, wherein the transmitter and the receiver establish a connection with the another node, and wherein the receiver receives, from the another node, a message including node information including at least one of connection information between nodes, an advertisement process period as a period by which an advertisement process is performed, and the scan process period.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to transmit/receive a signal in a mesh network.

An embodiment of the present disclosure enables to transmit/receive a signal based on a network topology in a mesh network.

An embodiment of the present disclosure enables to transmit/receive a signal thereby signal retransmission is possible in a mesh network.

An embodiment of the present disclosure enables to transmit/receive a signal thereby preventing acknowledgement (ACK) delay in a mesh network.

An embodiment of the present disclosure enables to transmit/receive a signal thereby decreasing a collision occurrence probability in a mesh network.

An embodiment of the present disclosure enables to transmit/receive a signal thereby enhancing communication reliability in a mesh network.

An embodiment of the present disclosure enables to transmit/receive a signal thereby decreasing connection delay in a mesh network.

An embodiment of the present disclosure enables to transmit/receive a signal thereby decreasing power consumption in a mesh network.

An embodiment of the present disclosure enables to transmit/receive a signal thereby increasing a data rate in a mesh network.

BRIEF DESCRIPTION OF DRAWINGS

The above and other aspects, features and advantages of certain exemplary embodiments of the present disclosure will be more apparent from the following description taken in conjunction with the accompanying drawings, in which:

FIG. 5 schematically illustrates an advertising and scan process in a node in a BLE mesh network supporting a connection scheme according to an embodiment of the present disclosure;

FIG. 6 schematically illustrates an operating process in a node which is powered on in a BLE mesh network supporting a connection scheme according to an embodiment of the present disclosure;

Throughout the drawings, it should be noted that like reference numbers are used to depict the same or similar elements, features, and structures.

MODE FOR CARRYING OUT THE INVENTION

Figure 1:
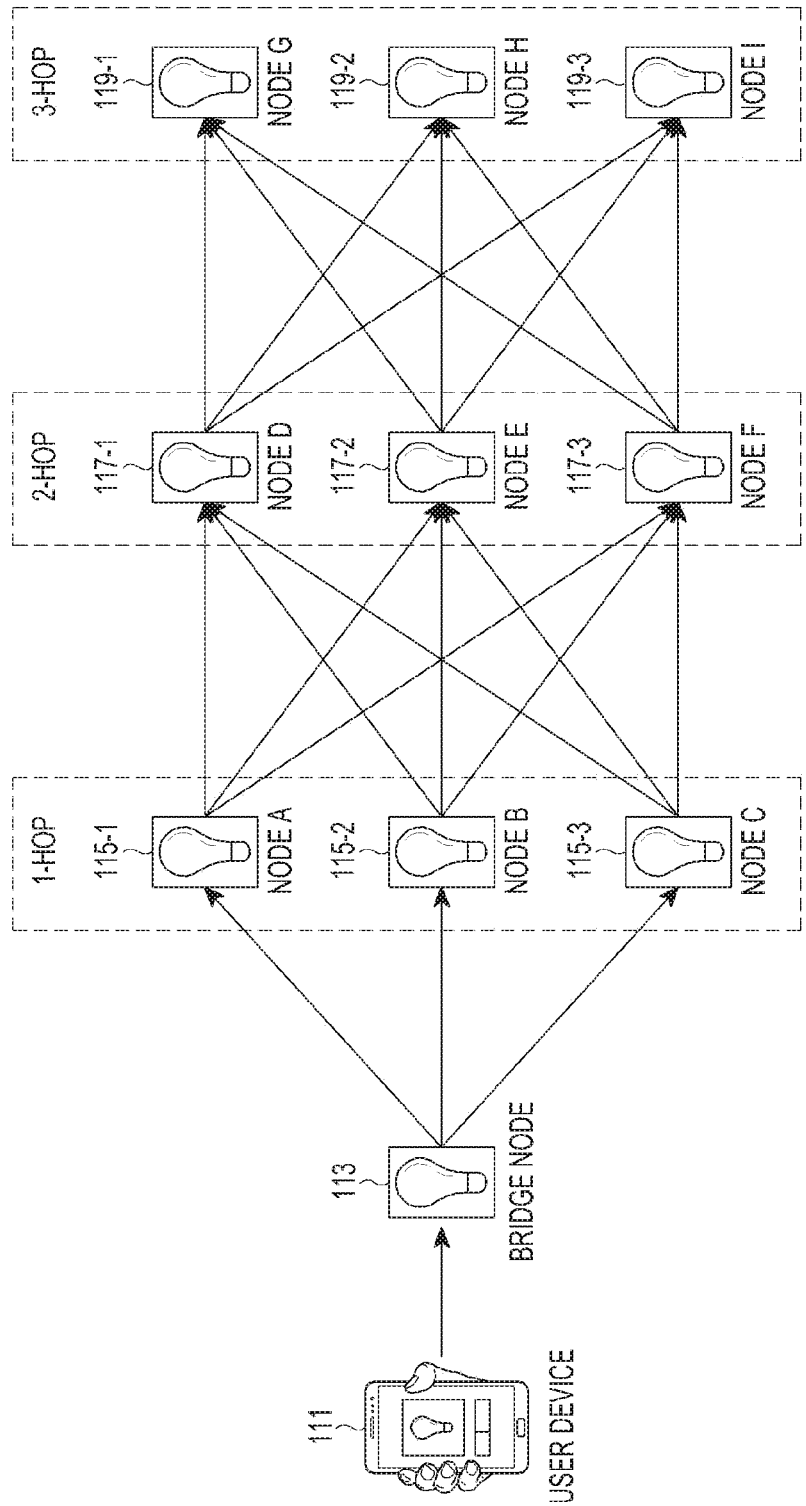
FIG. 1 schematically illustrates a structure of a BLE mesh network supporting a flooding scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user device and a node may be, for example, an electronic device.

An embodiment of the present disclosure proposes an apparatus and method for transmitting/receiving a signal in a mesh network.

An embodiment of the present disclosure proposes an apparatus and method for transmitting/receiving a signal based on a network topology in a mesh network.

An embodiment of the present disclosure proposes an apparatus and method for transmitting/receiving a signal thereby signal retransmission is possible in a mesh network.

An embodiment of the present disclosure proposes an apparatus and method for transmitting/receiving a signal thereby preventing acknowledgement (ACK) delay in a mesh network.

An embodiment of the present disclosure proposes an apparatus and method for transmitting/receiving a signal thereby decreasing a collision occurrence probability in a mesh network.

An embodiment of the present disclosure proposes an apparatus and method for transmitting/receiving a signal thereby enhancing communication reliability in a mesh network.

An embodiment of the present disclosure proposes an apparatus and method for transmitting/receiving a signal thereby decreasing connection delay in a mesh network.

An embodiment of the present disclosure proposes an apparatus and method for transmitting/receiving a signal thereby decreasing power consumption in a mesh network.

An embodiment of the present disclosure proposes an apparatus and method for transmitting/receiving a signal thereby increasing a data rate in a mesh network.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

In an embodiment of the present disclosure, for convenience, it will be assumed that a mesh network is a mesh network supporting a connection scheme, and the mesh network supporting the connection scheme is, for example, a Bluetooth low energy (BLE) mesh network. The BLE mesh network denotes a mesh network supporting a BLE mode, and the BLE mesh network supports the connection scheme using data channels.

A structure of a BLE mesh network supporting a flooding scheme according to an embodiment of the present disclosure will be described with reference to FIG. 1.

FIG. 1 schematically illustrates a structure of a BLE mesh network supporting a flooding scheme according to an embodiment of the present disclosure.

Referring to FIG. 1, the BLE mesh network supporting the flooding scheme uses BLE channels, and the BLE channels include, for example, total 40 channels, i.e., advertisement channels and data channels.

The advertisement channels include N advertisement channels, e.g., 3 advertisement channels, e.g., an advertisement channel 37, an advertisement channel 38, and an advertisement channel 39, and are used for discovering a service and/or a device. Here, the advertisement channel 37 is a 2402 MHz channel, the advertisement channel 38 is a 2426 MHz channel, and the advertisement channel 39 is a 2480 MHz channel.

The data channels include M data channels, for example, 37 data channels, e.g., a data channel 0 to a data channel 36, and are used for transmitting/receiving data traffic. Here, each of the data channel 0 to the data channel 36 is a 2404 MHz channel or a 2478 MHz channel except for a 2426 MHz channel.

Each of the 40 channels occupies 2 MHz, and, for example, a Gaussian Frequency Shift Keying (GFSK) scheme is used as a modulation scheme for the 40 channels.

The BLE mesh network includes a user device 111, a bridge node 113, and a plurality of nodes, e.g., total 9 nodes, i.e., a node A 115-1, a node B 115-2, a node C 115-3, a node D 117-1, a node E 117-2, a node F 117-3, a node G 119-1, a node H 119-2, and a node I 119-3.

The user device 111 may be, for example, a smart phone, and the bridge node 113 directly communicates with the user device 111.

Each of the node A 115-1, the node B 115-2, the node C 115-3, the node D 117-1, the node E 117-2, the node F 117-3, the node G 119-1, the node H 119-2, and the node I 119-3 may be one of a smart Light Emitted Diode (LED), a thermometer, a washing machine, a smart refrigerator, a robot cleaner, a smart Television (TV), a digital camera, a smart phone, a wearable device, and/or the like. An own function of the smart LED, the thermometer, and/or the like is relatively simple, so a hardware for providing a specific service, e.g., an Internet of Things (IoT) service may be also defined as small things which are implemented small, the washing machine, the smart refrigerator, the robot cleaner, and/or the like may be defined as big things without a display, and the smart TV, the digital camera, the smart phone, the wearable device, and/or the like may be defined as big things with a display.

Each of the node A 115-1, the node B 115-2, the node C 115-3, the node D 117-1, the node E 117-2, the node F 117-3, the node G 119-1, the node H 119-2, and the node I 119-3 may transmit/receive sensor data measured through a sensor included in the inside thereof or data (for example, data in a packet form) including information collected from a corresponding node, so corresponding information may be collected in the user device 111.

Each of the node A 115-1, the node B 115-2, the node C 115-3, the node D 117-1, the node E 117-2, the node F 117-3, the node G 119-1, the node H 119-2, and the node I 119-3 may provide an external service server with the sensor data measured through the sensor included in the inside thereof or the data including the information collected from the corresponding node thereby a service which is based on each information may be provided. For example, an indoor temperature measured by a thermometer may be provided to the user device 111, so the indoor temperature may be adjusted.

In FIG. 1, the BLE mesh network supporting the flooding scheme has been described with, for example, a case that the BLE mesh network supporting the flooding scheme provides an IoT service, however, it will be noted that a service which the BLE mesh network supporting the flooding scheme provides is not limited to only the IoT service.

Meanwhile, there is no detailed consideration for the following aspects in a BLE mesh network which has been proposed up to now.

(1) Aspect of Signal Retransmission

A BLE mesh network which has been proposed up to now does not consider a case that data is lost, so there is no node for performing a retransmitting operation on the lost data if the data is lost in the BLE mesh network. If data is lost in the BLE mesh network, a final node which needs to receive data of a user device as well as the user device may not recognize whether there is data transmission.

In a current BLE mesh network, a mesh use case has been mainly implemented in a control application such as light control, home control, and/or the like, so reliability may be very important factor.

As described above, a current BLE mesh network does not consider data retransmission, so reliability is degraded when data loss occurs.

So, an embodiment of the present disclosure proposes a signal transmitting/receiving scheme thereby signal retransmission is possible for enhancing reliability in a BLE mesh network, this will be described below, and a detailed description thereof will be omitted herein.

(2) Aspect of ACK Delay

An ACK delay phenomenon which may occur in a general BLE mesh network will be described with reference to FIG. 2.

Figure 2:
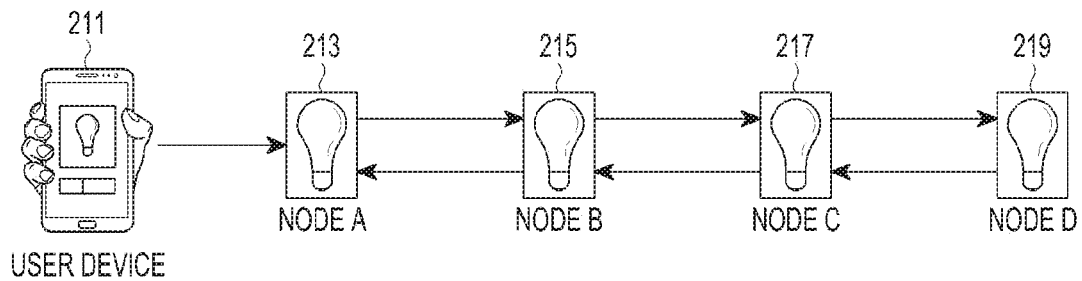
FIG. 2 schematically illustrates an ACK delay phenomenon which may occur in a general BLE mesh network.

FIG. 2 schematically illustrates an ACK delay phenomenon which may occur in a general BLE mesh network.

Referring to FIG. 2, the BLE mesh network includes a user device 211, a node A 213, a node B 215, a node C 217, and a node D 219. It will be assumed that each of the node A 213, the node B 215, the node C 217, and the node D 219 is, for example, a smart LED. The node A 213 is a bridge node.

Firstly, the user device 211 needs to pass total 4 hops from the user device 211 in order to turn on the node D 219. In a current BLE mesh network, a mesh network is configured using an advertisement channel, so corresponding data, i.e., a packet including a turn-on command for turning on the node D 219 is transmitted from the user device 211 to the node D 219, and then the node D 219 may transmit, to the user device 211, ACK for the corresponding data transmitted by the user device 211.

So, the user device 211 needs to wait for time of D(delay time per hop)*K(the number of hops)*2+α(node processing delay time)*4 until receiving an ACK for data transmitted by the user device 211.

In FIG. 2, it will be assumed that delay time per hop D is, for example, 100 msecs, and node processing delay time a is, for example, 100 msecs. In an example as shown in FIG. 2, the user device 211 may receive ACK for data transmitted by the user device 211 only after time of 100 msecs*3*2+100 msecs*4, i.e., time of about 1 sec (1000 msecs) elapses.

As described above, in a current BLE mesh network, significant ACK delay occurs, so an embodiment of the present disclosure proposes a signal transmitting/receiving scheme for preventing ACK delay in a BLE mesh network, this will be described below, and a detailed description thereof will be omitted herein.

(3) Aspect of Collision Occurrence Probability

A collision phenomenon which may occur in a general BLE mesh network will be described with reference to FIG. 3.

Figure 3:
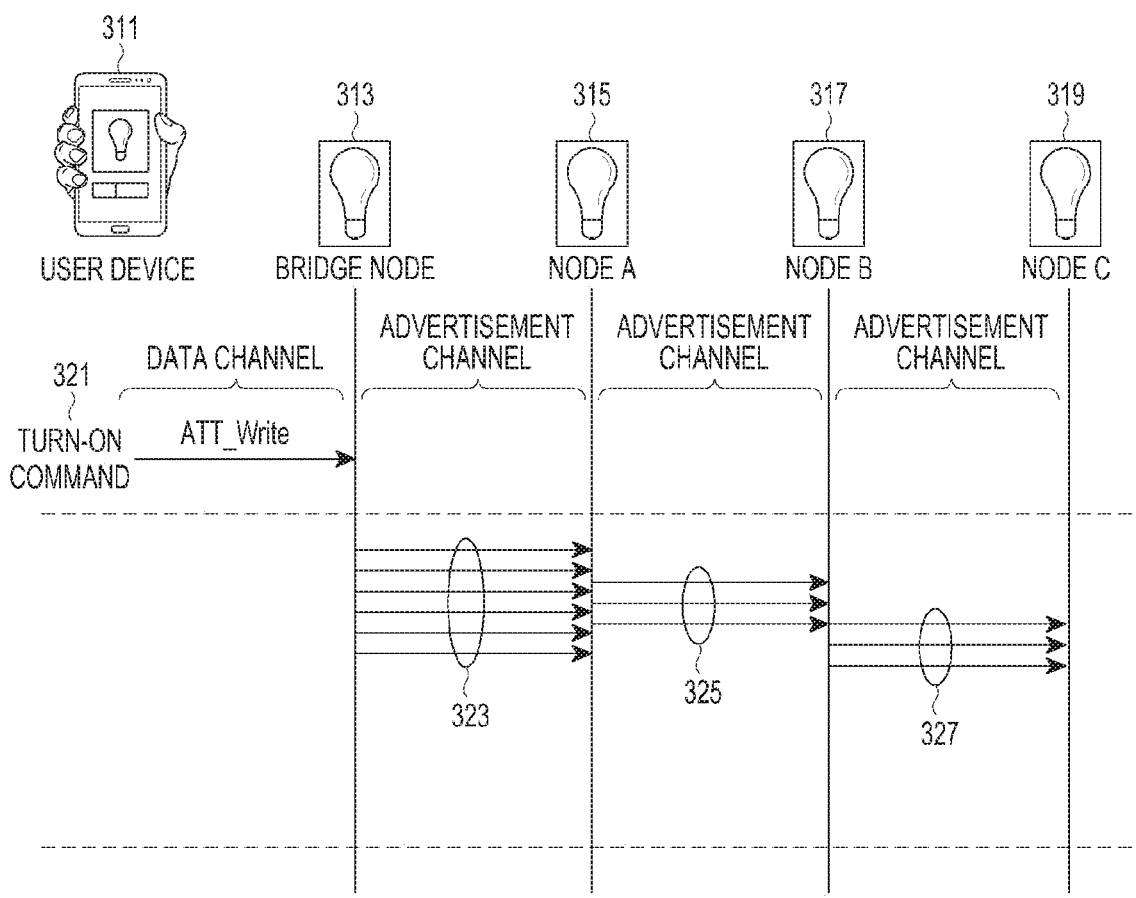
FIG. 3 schematically illustrates a collision phenomenon which may occur in a general BLE mesh network.

FIG. 3 schematically illustrates a collision phenomenon which may occur in a general BLE mesh network.

Referring to FIG. 3, the BLE mesh network includes a user device 311, a bridge node 313, a node A 315, a node B 317, and a node C 319. It will be assumed that each of the node A 315, the node B 317 and the node C 319 is, for example, a smart LED.

The user device 311 transmits a packet including a turn-on command to the bridge node 313 through a data channel in order to turn on the node C 319 (321), and the bridge node 313 floods the packet received from the user device 311 through advertisement channels corresponding to a value of a preset relay count (relay_cnt). For example, it will be assumed that a value of the relay_cnt of the bridge node 313 is set to 6 (relay_cnt=6), so the bridge node 313 floods a packet received from the user device 311 through advertisement channels total 6 times. Here, the packet includes a turn-on command which turns on the node C 319, the number of the advertisement channels is 3, so the bridge node 313 floods the packet total 18 times.

The next node, i.e., the node A 315, which receives a packet from the bridge node 313, floods a packet received from the bridge node 313 corresponding to a preset relay_cnt value. For example, it will be assumed that a value of the relay_cnt of the node A 315 is set to 3 (relay_cnt=3), so the node A 315 floods the packet received from the bridge node 313 total 3 times through advertisement channels. Here, the number of the advertisement channels is 3, so the node A 315 floods the packet total 9 times.

The next node, i.e., the node B 317, which receives a packet from the node A 315, floods the packet received from the node A 315 corresponding to a preset relay_cnt value. For example, it will be assumed that a value of the relay_cnt of the node B 317 is set to 3 (relay_cnt=3), so the node B 317 floods the packet received from the node A 315 total 3 times through advertisement channels. Here, the number of the advertisement channels is 3, so the node B 317 floods the packet total 9 times.

As described above, a relay_cnt value of each node is set to a predetermined fixed-value, so the more increased a density of node in the BLE mesh network is, the more increased a probability that collision occurs is.

So, an embodiment of the present disclosure proposes a signal transmitting/receiving scheme for decreasing a collision occurrence probability in a BLE mesh network, and this will be described below, so a detailed description thereof will be omitted herein.

(4) Aspect of Power Consumption

A BLE mode is rapidly applied to sensors and nodes of a relatively small size which operate on a battery basis with a keyword low energy consumption. However, in a general mesh network, all nodes included in the mesh network operate on an "Always Scan" mode as a mode on which a scan operation is always performed.

Most of BLE chipsets consumes a relatively large amount of current, e.g., an about 15 mA of current when a scan operation is performed, so it is impossible for the most of BLE chipsets to operate on a battery based-environment.

As described above, in a current BLE mesh network, significant power consumption occurs, so an embodiment of the present disclosure proposes a signal transmitting/receiving scheme which decreases power consumption in a BLE mesh network, this will be described below, and a detailed description thereof will be omitted herein.

Firstly, an embodiment of the present disclosure proposes a connection-based BLE mesh network which uses a data channel, i.e., a BLE mesh network supporting a connection scheme by considering the aspects as described above. That is, in an embodiment of the present disclosure, a signal is transmitted/received based on a connection scheme, not a flooding scheme in a BLE mesh network.

An example of an inner structure of a node in a BLE mesh network supporting a connection scheme according to an embodiment of the present disclosure will be described with reference to FIG. 4.

Figure 4:
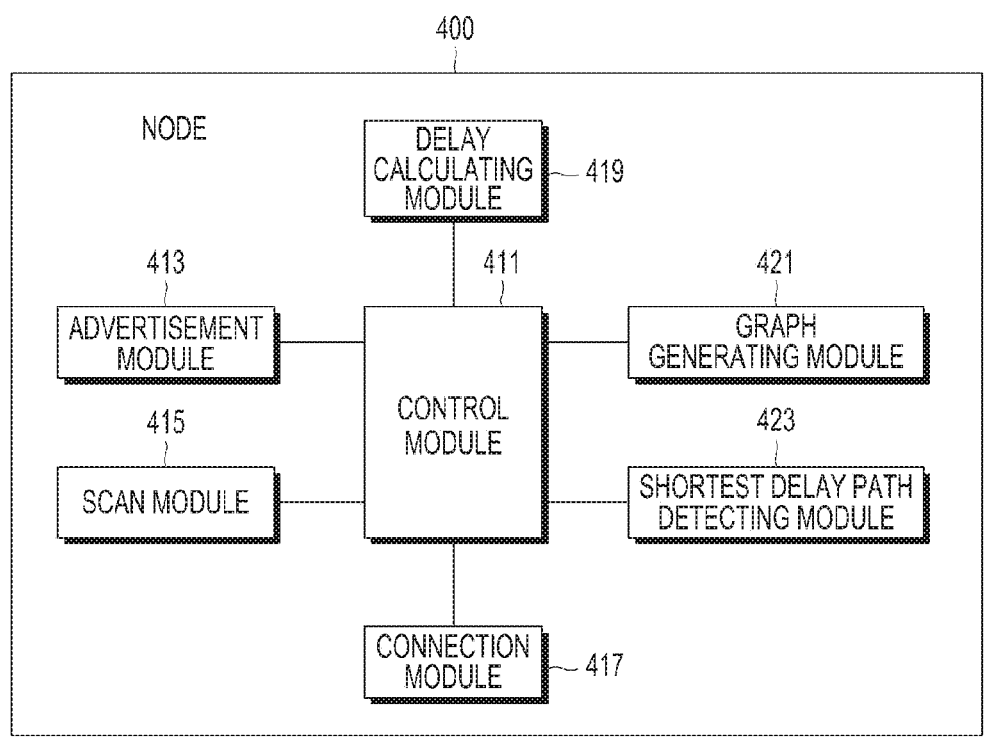
FIG. 4 schematically illustrates an example of an inner structure of a node in a BLE mesh network supporting a connection scheme according to an embodiment of the present disclosure.

FIG. 4 schematically illustrates an example of an inner structure of a node in a BLE mesh network supporting a connection scheme according to an embodiment of the present disclosure.

Prior to a description of FIG. 4, a node 400 as shown in FIG. 4 may be a bridge node, or may be one of nodes other than the bridge node.

Referring to FIG. 4, the node 400 includes a control module 411, an advertisement module 413, a scan module 415, a connection module 417, a delay calculating module 419, a graph generating module 421, and a shortest delay path detecting module 423.

The control module 411 controls the overall operation of the node 400, and more particularly, controls an operation related to an operation of transmitting/receiving a signal in a BLE mesh network supporting a connection scheme according to an embodiment of the present disclosure. Particularly, the control module 411 controls an operation of each of the advertisement module 413, the scan module 415, the connection module 417, the delay calculating module 419, the graph generating module 421, and the shortest delay path detecting module 423.

The advertisement module 413 periodically advertises presence of the node 400 using an advertisement channel under a control of the control module 411. That is, the advertisement module 413 transmits an advertisement message including a protocol data unit (PDU) of which a PDU type is an ADV_IND through the advertisement channel. The ADV_IND indicates a connectable undirected advertising event. So, if the advertisement module 413 transmits the advertisement message including the PDU of the ADV_IND type, a node other than the node 400 may be connected to the node 400.

The scan module 415 periodically performs a scan operation during a preset interval corresponding to a predetermined period for receiving an advertisement message transmitted by the node other than the node 400.

The connection module 417 performs an operation of transmitting/receiving data between the node and another node through a data channel according to a connection process of a BLE mode for data transmission/reception between the node and the another node under a control of the control module 411.

The delay calculating module 419 calculates delay which occurs in a case that a specific node starts transmission under a control of the control module 411.

The graph generating module 421 generates a graph for a specific node based on information about all nodes included in the BLE mesh network under a control of the control module 411.

The shortest delay path detecting module 423 calculates delay which occurs from a specific node to a final node, i.e., a destination node, and detects the shortest delay path, i.e., an optimal path between the specific node and the final node based on the calculated delay under a control of the control module 411.

Although the control module 411, the advertisement module 413, the scan module 415, the connection module 417, the delay calculating module 419, the graph generating module 421, and the shortest delay path detecting module 423 are described as separate units in the node 400 in FIG. 4, it is to be understood that the node 400 may be implemented with a form into which at least two of the control module 411, the advertisement module 413, the scan module 415, the connection module 417, the delay calculating module 419, the graph generating module 421, and the shortest delay path detecting module 423 are incorporated. The node 400 may be implemented with one processor.

An example of an inner structure of a node in a BLE mesh network supporting a connection scheme according to an embodiment of the present disclosure has been described with reference to FIG. 4, and an advertisement and scan process in a node in a BLE mesh network supporting a connection scheme according to an embodiment of the present disclosure will be described with reference to FIG. 5.

FIG. 5 schematically illustrates an advertisement and scan process in a node in a BLE mesh network supporting a connection scheme according to an embodiment of the present disclosure.

Prior to a description of FIG. 5, a node A 511 as shown in FIG. 5 may be a bridge node, or may be one of nodes other than the bridge node.

Referring to FIG. 5, the node A 511 performs an advertisement process by a predetermined first period, e.g., a TAD. It will be noted that the advertisement process is shown as "Ad" in FIG. 5. The advertisement process is identical to an advertisement process performed in a general BLE mesh network, and a detailed description of the advertisement process will be omitted herein.

The node A 511 performs a scan process by a predetermined second period, e.g., a TSC. It will be noted that the scan process is shown as "Scan" in FIG. 5. The scan process is identical to a scan process performed in a general BLE mesh network, and a detailed description of the scan process will be omitted herein.

The TAD used in the advertisement process and the TSC used in the scan process may be the same or different.

An advertisement and scan process in a node in a BLE mesh network supporting a connection scheme according to an embodiment of the present disclosure has been described with reference to FIG. 5, and an operating process in a node which is powered on in a BLE mesh network supporting a connection scheme according to an embodiment of the present disclosure will be described with reference to FIG. 6.

FIG. 6 schematically illustrates an operating process in a node which is powered on in a BLE mesh network supporting a connection scheme according to an embodiment of the present disclosure.

Prior to a description of FIG. 6, each of a node A 611 and a node B 613 as shown in FIG. 6 may be a bridge node, or may be one of nodes other than the bridge node. The node B 613 is a node which is firstly powered on.

Referring to FIG. 6, in a state that the node A 611 performs an advertisement process and a scan process with a scheme as described in FIG. 5, the node B 613 is firstly powered on. The powered-on node B 613 performs a full scan process (615). According that the full scan process is performed, the node B 613 transmits a connection request (Connect_REQ) message for requesting to establish a connection to the node A 611 (617). The full scan process is identical to a full scan process performed in a general BLE mesh network, and a detailed description of the full scan process will be omitted herein.

An operating process in a node which is powered on in a BLE mesh network supporting a connection scheme according to an embodiment of the present disclosure has been described with reference to FIG. 6, and an example of a process of transmitting an advertisement message while performing an advertisement process thereby a node which is performing a scan process transmits a Connect_REQ message after receiving the advertisement message and then a connection is established, and transmitting/receiving data in a BLE mesh network supporting a connection scheme according to an embodiment of the present disclosure will be described with reference to FIG. 7.

Figure 7:
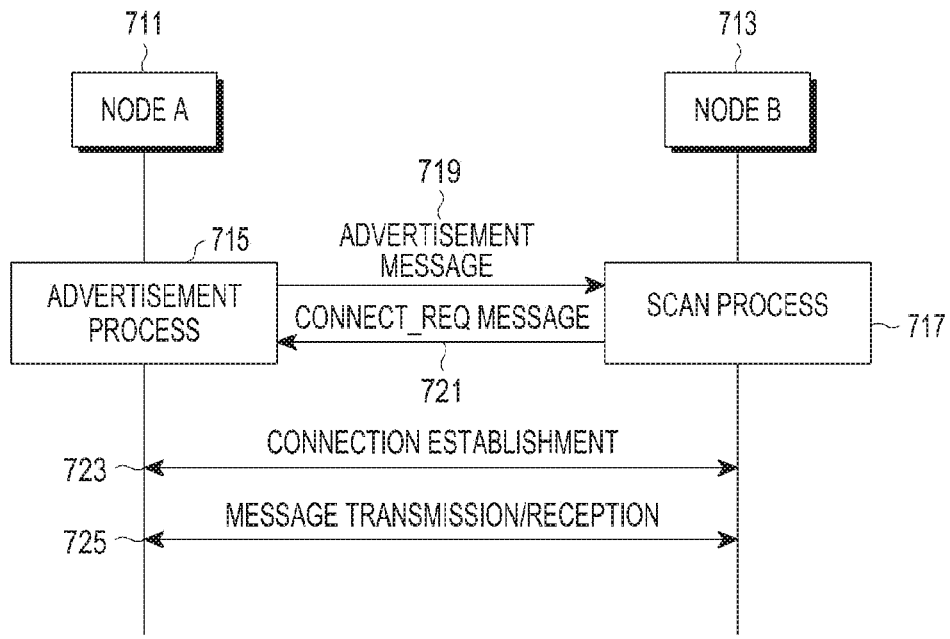
FIG. 7 schematically illustrates an example of a process of transmitting an advertisement message while performing an advertisement process thereby a node which is performing a scan process transmits a Connect_REQ message after receiving the advertisement message and then a connection is established, and transmitting/receiving data in a BLE mesh network supporting a connection scheme according to an embodiment of the present disclosure.

FIG. 7 schematically illustrates an example of a process of transmitting an advertisement message while performing an advertisement process thereby a node which is performing a scan process transmits a Connect_REQ message after receiving the advertisement message and then a connection is established, and transmitting/receiving data in a BLE mesh network supporting a connection scheme according to an embodiment of the present disclosure.

Prior to a description of FIG. 7, it will be noted that a process as shown in FIG. 7 is a process in which a node which performs a scan process receives an advertisement message from another node which performs an advertisement process, transmits a Connect_REQ to the another node which performs the advertisement process thereby a connection is established between the node which performs the scan process and the another node which performs the advertisement process, and transmits/receives data.

Referring to FIG. 7, each of a node A 711 and a node B 713 as shown in FIG. 7 may be a bridge node, or may be one of nodes other than the bridge node.

The node A 711 is performing an advertisement process (at operation 715), and the node B 713 is performing a scan process (at operation 717). The node A 711 knows a scan process period of the node B 713. Since the node A 711 is performing the advertisement process, the node A 711 transmits an advertisement message through an advertisement channel (at operation 719).

Meanwhile, the node B 713 receives the advertisement message transmitted by the node A 711, and transmits a Connect_REQ message to the node A 711 based on the advertisement message (at operation 721).

According that the node A 711 receives the Connect_REQ message from the node B 713, a connection is established between the node A 711 and the node B 713 (at operation 723). According that the connection is established, the node A 711 and the node B 713 may transmit/receive data each other.

So, the node A 711 transmits a message including information about an advertisement process period and a scan process period of the node A 711 to the node B 713. The node B 713 transmits a message including information about an advertisement process period and a scan process period of the node B 713 to the node A 711. The node A 711 stores the advertisement process period and the scan process period of the node B 713 received from the node B 713. The node A 711 transmits, to the node B 713, a message including node information, e.g., at least one of connection information between nodes, an advertisement process period, a scan process period, and the number of hops, for each of all other nodes which the node A 711 stores. Here, the number of hops denotes the number of hops which exist between the node A 711 and a corresponding node. The connection information between the nodes will be described with reference to FIG. 9, and a detailed description thereof will be omitted herein. The node B 713 is capable of collecting information for nodes included in the BLE mesh network based on the message received from the node A 711 including the node information, e.g., the at least one of the connection information between the nodes, the advertisement process period, the scan process period, and the number of hops, for each of all other nodes which the node A 711 stores (at operation 725).

An example of a process of transmitting an advertisement message while performing an advertisement process thereby a node which is performing a scan process transmits a Connect_REQ message after receiving the advertisement message and then a connection is established, and transmitting/receiving data in a BLE mesh network supporting a connection scheme according to an embodiment of the present disclosure has been described with reference to FIG. 7, and an example of a process of receiving an advertisement message while performing a scan process, transmitting a Connect_REQ message to a node which is performing an advertisement process thereby a connection is established, and transmitting/receiving data in a BLE mesh network supporting a connection scheme according to an embodiment of the present disclosure will be described with reference to FIG. 8.

Figure 8:
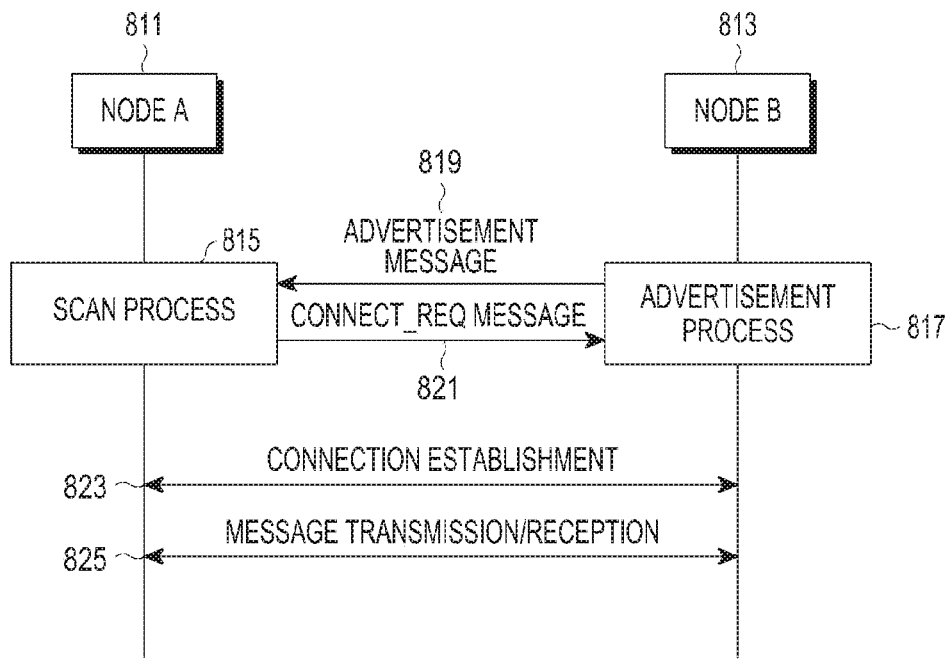
FIG. 8 schematically illustrates an example of a process of receiving an advertisement message while performing a scan process, transmitting a Connect_REQ message to a node which is performing an advertisement process thereby a connection is established, and transmitting/receiving data in a BLE mesh network supporting a connection scheme according to an embodiment of the present disclosure.

FIG. 8 schematically illustrates an example of a process of receiving an advertisement message while performing a scan process, transmitting a Connect_REQ message to a node which is performing an advertisement process thereby a connection is established, and transmitting/receiving data in a BLE mesh network supporting a connection scheme according to an embodiment of the present disclosure.

Prior to a description of FIG. 8, it will be noted that a process as shown in FIG. 8 is a process in which a node which performs a scan process receives an advertisement message from a node which performs an advertisement process, transmits a Connect_REQ message to the node which performs the advertisement process thereby a connection is established, and transmits/receives data.

Referring to FIG. 8, each of a node A 811 and a node B 813 as shown in FIG. 8 may be a bridge node, or may be one of nodes other than the bridge node.

The node A 811 is performing a scan process (at operation 815), and the node B 813 is performing an advertisement process (at operation 817). The node A 811 knows an advertisement process period of the node B 813. Since the node B 813 is performing the advertisement process, the node B 813 transmits an advertisement message through an advertisement channel (at operation 819).

Meanwhile, the node A 811 receives the advertisement message transmitted by the node B 813, and transmits a Connect_REQ message to the node B 813 based on the advertisement message (at operation 821).

According that the node B 813 receives the Connect_REQ message from the node A 811, a connection is established between the node A 811 and the node B 813 (at operation 823). According that the connection is established, the node A 811 and the node B 813 may transmit/receive data each other.

So, the node B 813 transmits a message including information about an advertisement process period and a scan process period of the node B 813 to the node A 811. The node A 811 transmits a message including information about an advertisement process period and a scan process period of the node A 811 to the node B 813. The node B 813 stores the advertisement process period and the scan process period of the node A 811 received from the node A 811. The node B 813 transmits, to the node A 811, a message including node information, e.g., information about an advertisement process period, a scan process period, and the number of hops, for each of all other nodes which the node B 813 stores. The node A 811 is capable of collecting information for nodes included in the BLE mesh network based on the message received from the node B 813 including the node information, e.g., information about the advertisement process period, the scan process period, and the number of hops, for each of all other nodes which the node B 813 stores (at operation 825).

An example of a process of receiving an advertisement message while performing a scan process, transmitting a Connect_REQ message to a node which is performing an advertisement process thereby a connection is established, and transmitting/receiving data in a BLE mesh network supporting a connection scheme according to an embodiment of the present disclosure has been described with reference to FIG. 8, and a process of generating a network topology in a BLE mesh network supporting a connection scheme according to an embodiment of the present disclosure will be described with reference to FIG. 9.

Figure 9:
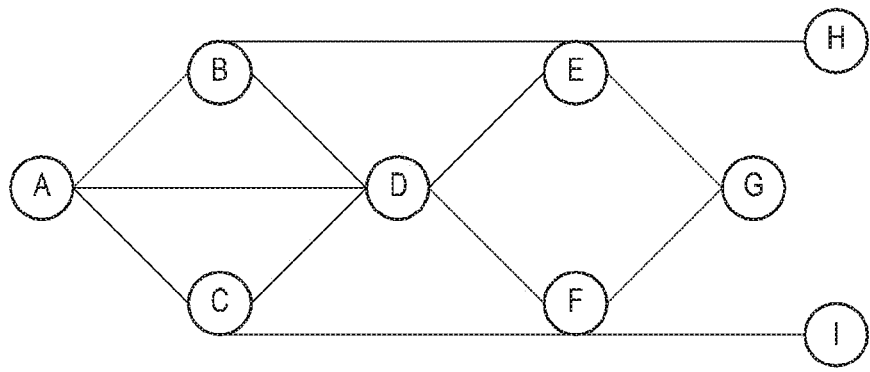
FIG. 9 schematically illustrates a process of generating a network topology in a BLE mesh network supporting a connection scheme according to an embodiment of the present disclosure.

FIG. 9 schematically illustrates a process of generating a network topology in a BLE mesh network supporting a connection scheme according to an embodiment of the present disclosure.

Prior to a description of FIG. 9, it will be assumed that the BLE mesh network includes, for example, total 9 nodes, e.g., a node A, a node B, a node C, a node D, a node E, a node F, a node G, a node H, and a node I, and each of the node A, the node B, the node C, the node D, the node E, the node F, the node G, the node H, and the node I may be a bridge node, or one of nodes other than the bridge node.

Referring to FIG. 9, a network topology is generated based on all nodes included in the BLE mesh network, a table is generated based on node information for each node, and the network topology is generated based on the generated table.

This will be described below.

Firstly, a network topology is generated based on the following three stages of processes. For example, a process of generating a network topology based on a node A will be described in FIG. 9.

(1) Reception of Node Information from Each of Neighbor Nodes

A node A receives node information from each of neighbor nodes of the node A. For example, it will be assumed that the node A receives node information, e.g., (A,B), (B, D), (B,E), and (E, H) from a node B, receives node information, e.g., (A, D), (B,D), (D, E), (D, F), and (E, G) from a node D, and receives node information, e.g., (A, C), (C, D), (C,F), (F, G), and (F, I) from a node C.

So, the node A may generate a node information table such as Table 1 based on the node information received from each of the neighbor nodes of the node A.

In Table 1, [X, Y] indicates that a connection is established from a node X to a node Y.

The node A records node information of a duplicated connection among node information received from each of the neighbor nodes at the node information table only one time.

The node A generates a network topology 913 based on the generated node information table 911. As shown in FIG. 9, the network topology 913 is generated by connecting edges if a value of 1 is written on the node information table 911 for all neighbor nodes based on the node A.

A process of generating a network topology in a BLE mesh network supporting a connection scheme according to an embodiment of the present disclosure has been described with reference to FIG. 9, and a process of calculating connection delay in a BLE mesh network supporting a connection scheme according to an embodiment of the present disclosure will be described with reference to FIG. 10.

Figure 10:
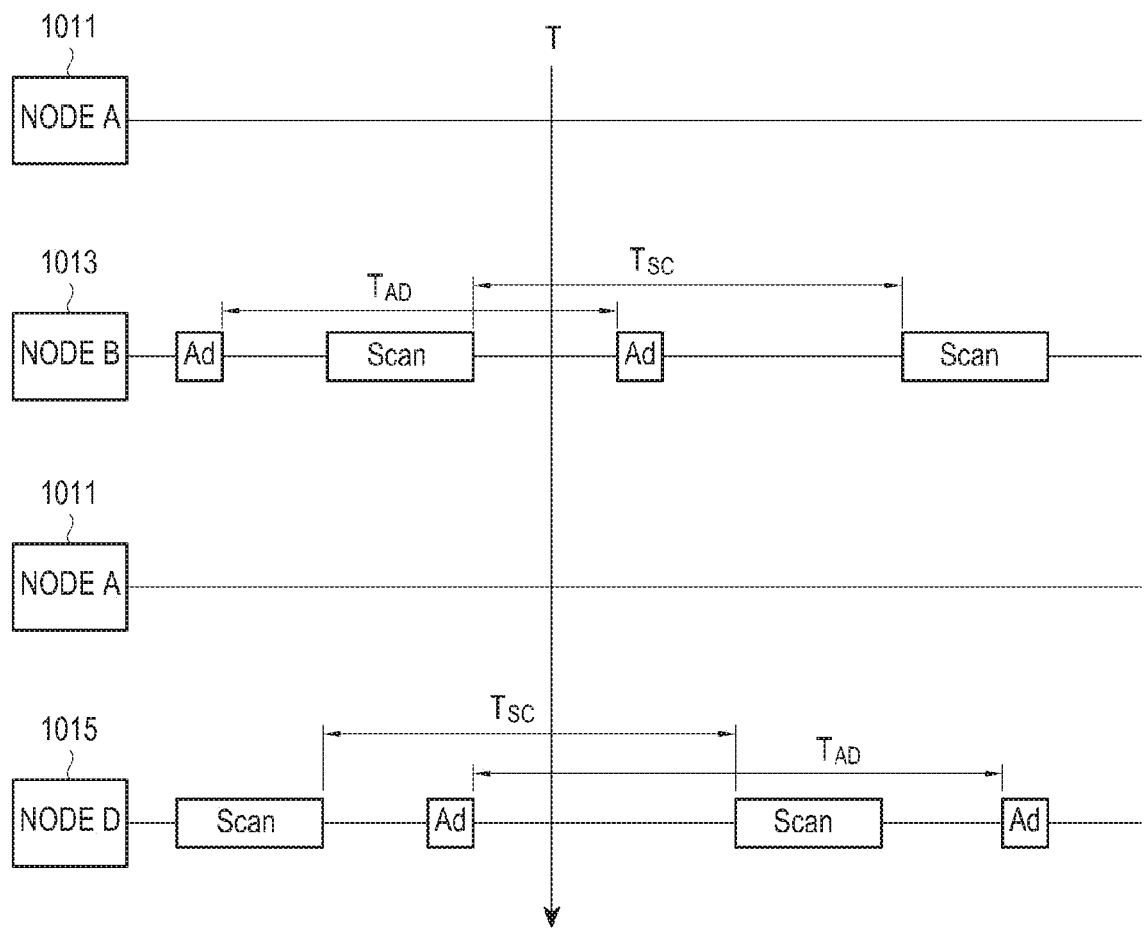
FIG. 10 schematically illustrates a process of calculating connection delay in a BLE mesh network supporting a connection scheme according to an embodiment of the present disclosure.

FIG. 10 schematically illustrates a process of calculating connection delay in a BLE mesh network supporting a connection scheme according to an embodiment of the present disclosure.

Referring to FIG. 10, it will be assumed that delay is calculated before a connection is established between a node A 1011 and a node B 1013.

Firstly, T-TAD is less than T-TSC (T-TAD<T-TSC) between the node A 1011 and the node B 1013, so the node A 1011 and the node B 1013 establish a connection in an interval during which the node B 1013 performs an advertisement process. So, delay on connection establishment, i.e., connection delay occurs between the node A 1011 and the node B 1013, and it will be assumed that connection delay of 10 occurs.

Next, T-TAD is greater than T-TSC (T-TAD>T-TSC) between the node A 1011 and a node D 1015, so the node A 1011 and the node D 1015 establish a connection in an interval during which the node D 1015 performs a scan process. So, delay on connection establishment, i.e., connection delay occurs between the node A 1011 and the node D 1015, and it will be assumed that connection delay of 20 occurs.

As described above, in a case of considering only the connection between the node A 1011 and the node B 1013 and the connection between the node A 1011 and the node D 1015, it will be understood that the connection between the node A 1011 and the node B 1013 has the shorter connection delay.

However, a connection needs to be established by considering all nodes included in the BLE mesh network as well

TABLE 1

| [00160] | [00161] | [00162] | [00163] | [00164] | [00165] | [00166] | [00167] | [00168] | [00169] |
| [00170] | [00171] | [00172] | [00173] | [00174] | [00175] | [00176] | [00177] | [00178] | [00179] |
| [00180] | [00181] | [00182] | [00183] | [00184] | [00185] | [00186] | [00187] | [00188] | [00189] |
| [00190] | [00191] | [00192] | [00193] | [00194] | [00195] | [00196] | [00197] | [00198] | [00199] |
| [00200] | [00201] | [00202] | [00203] | [00204] | [00205] | [00206] | [00207] | [00208] | [00209] |
| [00210] | [00211] | [00212] | [00213] | [00214] | [00215] | [00216] | [00217] | [00218] | [00219] |
| [00220] | [00221] | [00222] | [00223] | [00224] | [00225] | [00226] | [00227] | [00228] | [00229] |
| [00230] | [00231] | [00232] | [00233] | [00234] | [00235] | [00236] | [00237] | [00238] | [00239] |
| [00240] | [00241] | [00242] | [00243] | [00244] | [00245] | [00246] | [00247] | [00248] | [00249] |
| [00250] | [00251] | [00252] | [00253] | [00254] | [00255] | [00256] | [00257] | [00258] | [00259] |

In Table 1, A, B, C, D, E, F, G, H, and I indicate a node A, a node B, a node C, a node D, a node E, a node F, a node G, a node H, and a node I, respectively.

as corresponding nodes. So, in an embodiment of the present disclosure, the shortest delay path needs to be selected based on connection delay for all nodes included in a BLE mesh network, this will be described with reference to FIG. 11, and a detailed description thereof will be described herein.

A process of calculating connection delay in a BLE mesh network supporting a connection scheme according to an embodiment of the present disclosure has been described with reference to FIG. 10, and a process of detecting the shortest delay path in a BLE mesh network supporting a connection scheme according to an embodiment of the present disclosure will be described with reference to FIG. 11.

Figure 11:
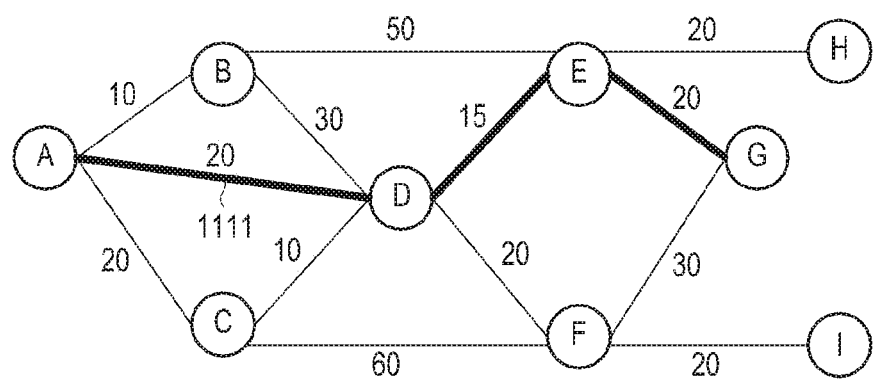
FIG. 11 schematically illustrates a process of detecting the shortest delay path in a BLE mesh network supporting a connection scheme according to an embodiment of the present disclosure.

FIG. 11 schematically illustrates a process of detecting the shortest delay path in a BLE mesh network supporting a connection scheme according to an embodiment of the present disclosure.

Prior to a description of FIG. 11, it will be assumed that the BLE network includes, for example, total 9 nodes such as a node A, a node B, a node C, a node D, a node E, a node F, a node G, a node H, and a node I as described in FIG. 9, and each of the node A, the node B, the node C, the node D, the node E, the node F, the node G, the node H, and the node I may be a bridge node or one of nodes other than the bridge node.

Referring to FIG. 11, for detecting the shortest delay path, i.e., an optimal path, to a final node, e.g., the node G, based on an arbitrary node, e.g., the node A, connection delay in a case of establishing a connection between corresponding nodes for all nodes included in the BLE mesh network needs to be calculated. Here, the connection delay may be calculated based on node information.

After the connection delay for all nodes included in the BLE mesh network is calculated, the node A generates a connection delay graph based on the calculated connection delay.

The node A selects the shortest delay path 1111 on which the connection delay between the node A and the node G may be minimized based on the generated graph, and transmits/receives a signal with the node G based on the selected shortest delay path 1111.

As described above, it will be understood that a BLE mesh network supporting a connection scheme according to an embodiment of the present disclosure has an effect in the following aspects.

(1) Enhancement of Communication Reliability According to Retransmission

A general BLE mesh network does not consider data loss and considers only unconditional flooding. However, in a BLE mesh network according to an embodiment of the present disclosure, a signal is transmitted/received between nodes based on a connection scheme, not a flooding scheme, so a retransmission scheme used in a medium access control (MAC) layer, e.g., a "Stop and Wait" scheme may be used. The "Stop and Wait" scheme is identical to a "Stop and Wait" scheme performed in a general BLE mesh network, and a detailed description thereof will be omitted herein.

Like this, according to use of the "Stop and Wait" scheme, data retransmission becomes possible, so a BLE mesh network supporting a connection scheme according to an embodiment of the present disclosure may have communication reliability enhanced compared to a general BLE mesh network.

(2) Elimination of ACK Delay

In a BLE mesh network supporting a connection scheme according to an embodiment of the present disclosure, signal transmission/reception between nodes is performed based on a connection, ACK of a "Stop and Wait" scheme supported in a MAC layer may be used. So, ACK delay which occurs in a general BLE mesh network may be prevented.

(3) Decrease of Collision Occurrence Probability

In a BLE mesh network supporting a connection scheme according to an embodiment of the present disclosure, a signal is transmitted/received based on a connection, not unconditional flooding, so a collision occurrence problem which occurs due to excessive flooding in a general BLE mesh network may be prevented.

(4) Maintenance of Low Power

In a BLE mesh network supporting a connection scheme according to an embodiment of the present disclosure, it is possible to decrease an interval during which an arbitrary node performs a scan process to about 10/1 compared to a general BLE mesh network, so a low-power operation as a basic advantage of a BLE mode becomes possible.

(5) Performance Enhancement

In a BLE mesh network supporting a connection scheme according to an embodiment of the present disclosure, a signal is transmitted/received using a data channel, so a data rate is increased compared to a general BLE mesh network in which a signal is transmitted/received using an advertisement channel. For example, in a general BLE mesh network in which a signal is transmitted/received using an advertisement channel, a data rate of up to 5-10 Kbps is supported, however, in a BLE mesh network supporting a connection scheme according to an embodiment of the present disclosure, a signal is transmitted/received using a data channel, so a data rate of up to 300 Kbps is supported.

Another example of an inner structure of a node in a BLE mesh network supporting a connection scheme according to an embodiment of the present disclosure will be described with reference to FIG. 12.

Figure 12:
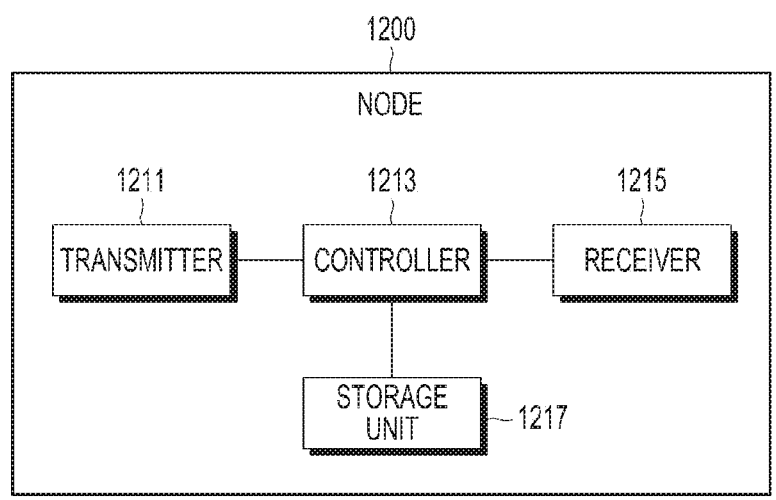
FIG. 12 schematically illustrates another example of an inner structure of a node in a BLE mesh network supporting a connection scheme according to an embodiment of the present disclosure.

FIG. 12 schematically illustrates another example of an inner structure of a node in a BLE mesh network supporting a connection scheme according to an embodiment of the present disclosure.

Referring to FIG. 12, a node 1200 includes a transmitter 1211, a controller 1213, a receiver 1215, and a storage unit 1217.

The controller 1213 controls the overall operation of the node 1200, and more particularly, controls an operation related to an operation of transmitting/receiving a signal in a BLE mesh network supporting a connection scheme according to an embodiment of the present disclosure. The operation related to the operation of transmitting/receiving the signal in the BLE mesh network supporting the connection scheme according to an embodiment of the present disclosure has been described with reference to FIGS. 4 to 11, and a detailed description thereof will be omitted herein.

The transmitter 1211 transmits various signals and various messages to other nodes, a user device, and/or the like included in the BLE mesh network under a control of the controller 1213. The various signals and the various messages transmitted by the transmitter 1211 have been described in FIGS. 4 to 11, and a detailed description thereof will be omitted herein.

The receiver 1215 receives various signals and various messages from the other nodes, the user device, and/or the like included in the BLE mesh network under a control of the controller 1213. The various signals and the various messages received by the receiver 1215 have been described in FIGS. 4 to 11, and a detailed description thereof will be omitted herein.

The storage unit 1217 stores a program, various data, and/or the like related to the operation related to the operation of transmitting/receiving the signal in the BLE mesh network supporting the connection scheme according to an embodiment of the present disclosure which the node 1200 performs under a control of the controller 1213.

The storage unit 1217 stores the various signals and various messages received by the receiver 1215 from the other nodes, the user device, and/or the like.

Although the transmitter 1211, the controller 1213, the receiver 1215, and the storage unit 1217 are described as separate units in the node 1200 in FIG. 12, it is to be understood that the node 1200 may be implemented with a form into which at least two of the transmitter 1211, the controller 1213, the receiver 1215, and the storage unit 1217 are incorporated. The node 1200 may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RANI, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like).A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting/receiving a signal in a first node in a mesh network, comprising:
   transmitting an advertisement message during an advertisement process period to establish a mesh network connection with a destination node;
   receiving, by the first node during the advertisement process period, a connection request message from a second node in a scan process period;
   establishing, by the first node, a connection with the second node based on the received connection request message;
   transmitting, from the first node to the second node via the established connection, a node information message including at least one of connection information between nodes, the advertisement process period, or the scan process period;
   obtaining a connection delay for the nodes based on a shortest time of either the advertisement process period or the scan process period for each node;
   obtaining a shortest delay path to the destination node in the mesh network based on the connection delay for the nodes; and
   communicating with the destination node via the shortest delay path.

2. The method of claim 1, wherein the node information message further includes information related to a number of hops between the first node and the second node.

3. The method of claim 1, further comprising:
   transmitting a message including node information for the first node, and node information for each node in communication with the first node other than the second node which is stored at the first node.

4. The method of claim 3,
   wherein the node information for the first node further includes information about a number of hops between the first node and the second node, and
   wherein the node information for each node in communication with the first node other than the second node which is stored at the first node further includes information about a number of hops between the first node and each node in communication with the first node other than the second node.

5. The method of claim 1, wherein the connection information between the nodes includes information related to a connection which has been established between nodes.

6. A method for transmitting/receiving a signal in a first node in a mesh network, comprising:
   receiving an advertisement message during a scan process period, from a second node in an advertisement process period;
   transmitting, to the second node, a connection request message for a mesh network connection with a destination node in response to receiving the advertisement message;
   establishing a connection with the second node;
   receiving, from the second node via the established connection, a node information message including at least one of connection information between nodes, the advertisement process period, or the scan process period;
obtaining a connection delay for the nodes based on a shortest time of either the advertisement process period or the scan process period for each node;
obtaining a shortest delay path to the destination node in the mesh network based on the connection delay for the nodes; and
communicating with the destination node via the shortest delay path.

7. The method of claim 6, further comprising:
receiving a message including node information for the second node, and node information for each node in communication with the second node other than the first node which is stored at the second node.

8. The method of claim 7,
wherein the node information for the second node further includes information about a number of hops between the second node and the first node, and
wherein the node information for each node in communication with the second node other than the first node which is stored at the second node further includes information about a number of hops between the second node and each node in communication with the second node other than the first node.

9. The method of claim 6, wherein the connection information between the nodes includes information related to a connection which has been established between nodes.

10. The method of claim 6, further comprising:
performing an advertisement process in an advertisement process period.

11. A first node in a mesh network, comprising:
a receiver;
a transmitter; and
at least one processor coupled to the receiver and the transmitter, wherein the at least one processor is configured to:
transmit an advertisement message during an advertisement process period to establish a mesh network connection with a destination node,
receive, via the receiver, a connection request message from a second node in a scan process period, during the advertisement process period,
control the receiver and the transmitter to establish a connection with the second node based on the received connection request message,
control the transmitter to transmit, to the second node via the established connection, a node information message including at least one of connection information between nodes, the advertisement process period, or the scan process period,
obtain a connection delay for the nodes based on a shortest time of either the advertisement process period and a time length of or the scan process period for each node,
obtain a shortest delay path to the destination node in the mesh network based on the connection delay for the nodes, and
communicate with the destination node via the shortest delay path.

12. The node of claim 11, wherein the node information message further includes information related to a number of hops between the first node and the second node.

13. The node of claim 11, wherein the at least one processor is further configured to control the transmitter to transmit a message including node information for the first node, and node information for each node in communication with the first node other than the second node which is stored at the first node.

14. The node of claim 13,
wherein the node information for the first node further includes information about a number of hops between the first node and the second node, and
wherein the node information for each node in communication with the first node other than the second node which is stored at the first node further includes information about a number of hops between the first node and each node in communication with the first node other than the second node.

15. The node of claim 11, wherein the connection information between the nodes includes information related to a connection which has been established between nodes.

16. A first node in a mesh network, comprising:
a receiver;
a transmitter; and
at least one processor coupled to the receiver and the transmitter, wherein the at least one processor is configured to:
receive, via the receiver, an advertisement message from a second node in an advertisement process, during a scan process period,
control the transmitter to transmit, to the second node, a connection request message for a mesh network connection with a destination node in response to receiving the advertisement message,
control the receiver and the transmitter to establish a connection with the second node,
receive, from the second node via the established connection, a node information message including at least one of connection information between nodes, the advertisement process period, or the scan process period,
obtain a connection delay for the nodes based on a shortest time of either the advertisement process period or the scan process period for each node,
obtain a shortest delay path to the destination node in the mesh network based on the connection delay for the nodes, and
communicate with the destination node via the shortest delay path.

17. The node of claim 16, wherein the at least one processor is further configured to receive, via the receiver, a message including node information for the second node, and node information for each node in communication with the second node other than the first node which is stored at the second node.

18. The node of claim 17,
wherein the node information for the second node further includes information about a number of hops between the second node and the first node, and
wherein the node information for each node in communication with the second node other than the first node which is stored at the second node further includes information about a number of hops between the second node and each node in communication with the second node other than the first node.

19. The node of claim 16, wherein the connection information between the nodes includes information related to a connection which has been established between nodes.

20. The node of claim 16, wherein the at least one processor is further configured to control the transmitter to perform an advertisement process in an advertisement process period.

* * * * *